F. W. SCHMIDT.
THERMOSTAT.
APPLICATION FILED AUG. 8, 1910.
976,749.
Patented Nov. 22, 1910.
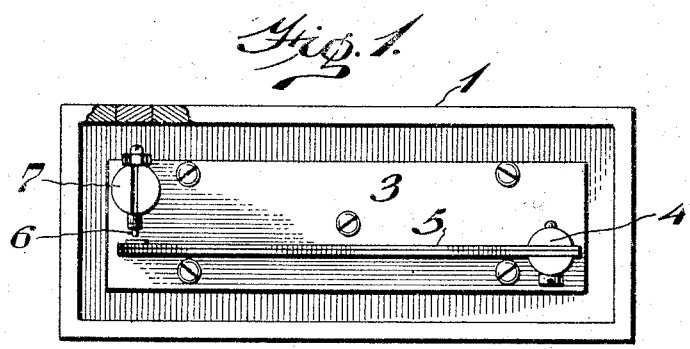
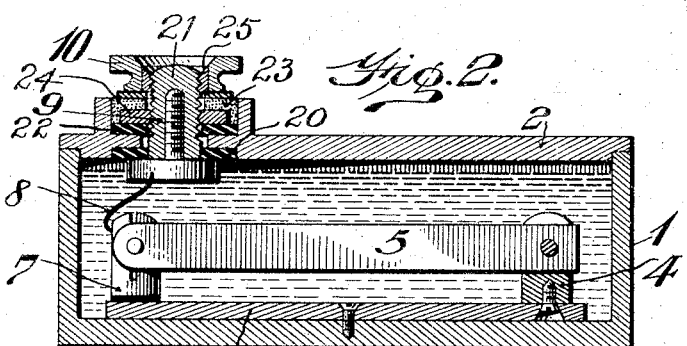
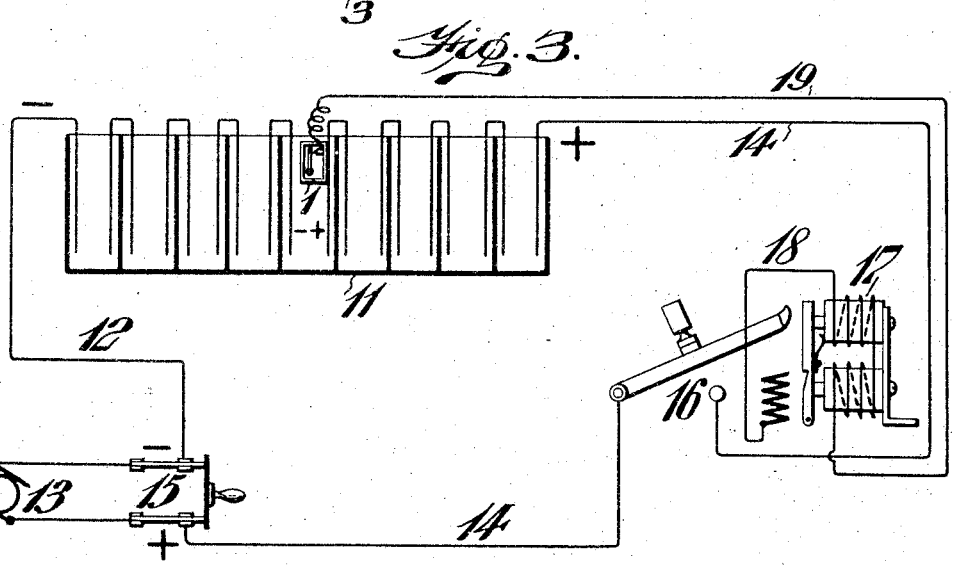
WITNESSES
H. G. Dieterich
P. F. Nagle
INVENTOR
Frederick W. Schmidt
BY Wiedersheim & Fairbanks
ATTORNEYS

UNITED STATES PATENT OFFICE.

FREDERICK W. SCHMIDT, OF PHILADELPHIA, PENNSYLVANIA.

THERMOSTAT.

976,749.  Specification of Letters Patent.  Patented Nov. 22, 1910.

Original application filed January 13, 1910, Serial No. 537,803. Divided and this application filed August 8, 1910. Serial No. 576,121.

*To all whom it may concern:*

Be it known that I, FREDERICK W. SCHMIDT, a citizen of the United States, residing in the city and county of Philadelphia, State of Pennsylvania, have invented a new and useful Thermostat, of which the following is a specification.

My invention consists of an improved thermostat especially designed for use in connection with storage batteries or similar electrical apparatus, in which charging or other electro-chemical action is governed by the temperature within the apparatus.

It further consists of such thermostat inclosed within an acid-resisting casing to form a terminal for a circuit controlling such action and to be immersed in the solution of the apparatus.

It further consists of such a thermostat in which the contact-pieces are covered by an insulating and heat-conducting liquid.

It further consists of other novel features of construction, all as will be hereinafter fully set forth.

This invention is the same as that disclosed in my earlier application for Letters Patent, No. 537,803, for battery temperature controller, filed January 13, 1910, of which application this present application is a division, and I do not desire to make any claims herein to anything forming the subject-matter of claims retained in said earlier application.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Similar numerals of reference indicate corresponding parts in the figures.

Referring to the drawings:—Figure 1 represents a plan view of my improved thermostat with the top of the inclosing casing removed. Fig. 2 represents a longitudinal section of the thermostat casing, showing the operative elements in side elevation. Fig. 3 represents a diagrammatic view showing the application and connection of the thermostat to a storage battery and its charging circuit and control.

The thermostat has a casing, 1, of an acid-resisting and electrically conducting material, such as lead, which casing is closed by a top, 2, secured to form a liquid-tight joint with the same. A metal plate, 3, is secured in and electrically connected to the bottom of the casing and has a post, 4, electrically connected to it, to which one end of a composite thermostat bar, 5, is secured and electrically connected. Said bar is of the construction usually employed in thermostats, composed of one bar of brass and another bar of steel, or it may be of any suitable construction and composition so as to be flexed to opposite sides by rise or drop in the surrounding temperature. An adjustable contact, 6, is supported in a post, 7, insulated from the base plate 3, to make contact with the flexed thermostat bar upon rise of temperature. The post is electrically connected by a wire, 8, or other wire, to a binding screw 9 which is preferably of brass and which is insulated from the lid or cover 2 of the casing by insulation 20, said screw being protected by a cap 21 formed of lead or any other acid resisting material, whereby said screw will not be subjected to the acid, it being understood that the said lead is suitably insulated from the cover 2, in the present instance, by means of insulation 22 and other insulation 23 and said cap 21 being in threaded engagement with a brass nut 24 for holding the parts in position while the said cap is further engaged by a nut 10 formed of lead having a brass nut 25 therein for engagement with the cap 21, whereby it will be understood that the cap is preferably insulated from the cover and has the conductor 19 suitably connected therewith. The casing is wholly or partly filled with a liquid, such as transformer oil, which serves to insure insulation of the parts, prevents formation of an arc between the contact-members, and possesses heat-conducting properties, so that the temperature of the battery solution or other surrounding medium may be communicated to the composite thermostat bar through said liquid.

As above stated, this thermostat is especially designed to be employed in the control of the charging of a storage battery, as fully set forth in the application of which this is a division, and the diagrammatic view in Fig. 3 of the drawings illustrates its application and connections.

The storage battery, 11, to be charged, is connected at one of its terminals by a conductor, 12, to one terminal of a generator, 13, and another conductor, 14, is connected to the other terminal of the generator and leads to the other terminal of the battery. A switch, 15, is provided between said conductors and generator terminals. This comprises the charging circuit. An automatic circuit-breaker (in the present instance disclosed as an automatically opening knife-switch, 16,) is connected in the circuit and closes the same when the switch-blade engages its terminals and is so held by a trigger which forms a part of or is connected to the armature of an electro-magnet, these parts forming a holding and releasing device, 17, for the circuit-breaker. The electro-magnet is wound in a branch or shunt circuit, one terminal, 18, of which is connected to the charging circuit through the circuit-breaker, while its other terminal, 19, is connected to one contact-member of the thermostat which is immersed in the battery solution.

When charging a battery, the conductors of the charging circuit, which has been closed at the main switch and at the circuit-breaker, are connected to the plugs, binding-posts or similar terminals of the battery, and the current from the generator will thus charge the battery. The thermostat, which is connected to one terminal of the shunt-circuit, is placed in the battery, immersed in the solution. If, during the charging of the battery, the temperature in the latter rises above a predetermined degree,— usually about 105° Fahrenheit,—to which the thermostat has been adjusted to close contact, the contacts close the shunt-circuit through the same, as the casing of the thermostat forms a terminal in the battery and thus diverts a portion of the charging circuit through the battery, to the shunt-circuit. This will energize the electro-magnet in the shunt-circuit and cause the latter to attract its armature and release the circuit-breaker, which will thus cut out the battery from the charging circuit and prevent damage from overheating and overcharging.

Having thus described my invention what I claim as new and desire to secure by Letters Patent, is:—

1. In a device of the character stated, a thermostat having a casing of electrically conducting acid-resisting material, a thermostatic arm suitably supported at one end within and electrically connected to said casing, a contact piece insulated from the casing and adjustably carried thereby adjacent the free end of said arm, and an insulating liquid substantially filling said casing serving to protect the parts and acting as a conductor of heat in order to assist in the actuation of the thermostat.

2. In a device of the character stated, a thermostat formed of a casing of electrically conducting acid-resisting material, a thermostatic arm in suitable electric communication with said casing, a contact piece insulated from said casing, a binding post supported by and insulated from said casing, a conductor between said contact piece and said binding post, transformer oil substantially filling said casing and serving to protect the parts and acting as a conductor of heat in order to assist in the actuation of the thermostat.

3. In a device of the character stated, a thermostat having a lead casing, an arm supported at one end within and electrically connected with said casing, formed of brass and steel suitably connected together in order to bend or bow when subjected to heat, a contact piece in said casing and insulated therefrom situated adjacent the free end of said arm, a binding post, a conductor connected with said contact piece and said binding post and means for insulating said binding post from said casing, and acid-resisting material protecting said binding post.

4. In a device of the character stated, a thermostat provided with an acid-resisting and electrically-conductive casing and having two contacts, one of which is electrically connected to said casing.

5. In a device of the character stated, a thermostat consisting of an acid-resisting and electrically-conductive casing, a stationary contact in said casing, a movable contact in the casing, and a filling of an insulating and heat-conducting liquid within said casing and covering said contacts, one of the contacts being electrically connected to the casing.

6. In a device of the character stated, a thermostat comprising a casing of electrically-conductive and acid-resisting material, contacts within said casing and one of the same electrically connected to the casing, and a filling in said casing of an insulating and heat-conducting liquid covering said contacts.

7. In a device of the character stated, a thermostat having an acid-resisting metallic casing, a binding post of acid-resisting metal and insulated from the casing, and a binding nut upon said post and formed from acid resisting material.

8. In a device of the character stated, an acid-resisting metallic casing, a thermostat within said casing and having one contact member electrically connected to the same, a binding post of acid-resisting metal and connected to the other contact member and supported by and insulated from the casing, and a binding nut upon said post and formed from acid resisting material.

9. In a device of the character stated, a casing of acid-resisting metal, a base-plate on the bottom of said casing and electrically connected to the same, a composite thermostatic contact strip secured and electrically connected to said plate, a contact insulated from the base plate and secured adjacent said strip to have the same contact with it when flexed, a binding post of acid-resisting metal and insulated from the casing, a screw in the inner end of said post, a connection from the stationary contact to said screw, and a binding nut of acid resisting material upon said post.

FREDERICK W. SCHMIDT.

Witnesses:
 WM. CANER WIEDERSEIM,
 J. C. McGLASHEN.